(12) United States Patent
De Oliveira et al.

(10) Patent No.: US 12,317,899 B2
(45) Date of Patent: Jun. 3, 2025

(54) AGROCHEMICAL COMPOSITION

(71) Applicant: QUÍMIÇÕS E SOLUCOES SUSTENTÁVEIS DO BRASIL S.A., São Paulo (BR)

(72) Inventors: Lidiane De Oliveira, Valinhos (BR); Rogerio Barbosa, São Paulo (BR)

(73) Assignee: QUÍMIçOS E SOLUCOES SUSTENTÁVEIS DO BRASIL S.A., Sáo Paulo (BR)

( * ) Notice: Subject to any disclaimer, the term of this patent is extended or adjusted under 35 U.S.C. 154(b) by 566 days.

(21) Appl. No.: 17/767,804

(22) PCT Filed: Oct. 9, 2020

(86) PCT No.: PCT/IB2020/059492
§ 371 (c)(1),
(2) Date: Apr. 8, 2022

(87) PCT Pub. No.: WO2021/070126
PCT Pub. Date: Apr. 15, 2021

(65) Prior Publication Data
US 2023/0147223 A1   May 11, 2023

(30) Foreign Application Priority Data

Oct. 9, 2019   (WO) .................. PCT/IB2019/058585

(51) Int. Cl.
*A01N 59/16*   (2006.01)
*C05D 9/02*   (2006.01)

(52) U.S. Cl.
CPC .............. *A01N 59/16* (2013.01); *C05D 9/02* (2013.01)

(58) Field of Classification Search
CPC .................................. A01N 9/16; C05D 9/02
See application file for complete search history.

(56) References Cited

U.S. PATENT DOCUMENTS

| | | |
|---|---|---|
| 3,472,840 A | 10/1969 | Stone et al. |
| 4,031,307 A | 6/1977 | DeMartino et al. |
| 4,547,571 A | 10/1985 | Mukohyama et al. |
| 4,663,159 A | 5/1987 | Brode, II et al. |
| 4,959,464 A | 9/1990 | Yeh |
| 5,387,675 A | 2/1995 | Yeh |
| 5,473,059 A | 12/1995 | Yeh |
| 5,532,350 A | 7/1996 | Cottrell et al. |
| 5,801,116 A | 9/1998 | Cottrell et al. |
| 6,146,570 A | 11/2000 | Stern |
| 6,383,344 B1 | 5/2002 | Miller et al. |
| 7,259,192 B2 | 8/2007 | Liu et al. |
| 2008/0112907 A1 | 5/2008 | Chan et al. |
| 2010/0029929 A1 | 2/2010 | Luczak et al. |

FOREIGN PATENT DOCUMENTS

| | | |
|---|---|---|
| CN | 101601410 A | 12/2009 |
| CN | 102726613 A | 10/2012 |
| CN | 107459436 A | 12/2017 |
| CN | 109384577 A | 2/2019 |
| WO | 2006069794 A2 | 7/2006 |
| WO | 2014005555 A1 | 1/2014 |

OTHER PUBLICATIONS

D. Kojic, et al. "Efficacy of natural aluminosilicates in moderating drought effects on the morphological and physiological parameters of maize plants," (*Zea mays* L.)—Journal of Soil Science and Plant Nutrition, 12 (1), pp. 113-123—doi: 10.4067/S0718-95162012000100010, 2012 (8 pages).

G. Roohizadeh et al., The study of Sodium silicate effects on the total protein content, and the activities of catalase, Peroxidase and Superoxide Dismutase of Vicia faba L ., Bull. Env. Pharmacol. Life Sci., vol. 3 [Special Issue V], pp. 243-246, 2014 (4 pages).

International Search report issued in corresponding International Application No. PCT/IB2020/059492; mailed Jan. 22, 2021 (4 pages).

Written Opinion of the International Searching Authority issued in corresponding International Application No. PCT/B2020/059492; dated Jan. 22, 2021 (6 pages).

*Primary Examiner* — Zohreh A Fay
(74) *Attorney, Agent, or Firm* — Osha Bergman Watanabe & Burton LLP

(57) ABSTRACT

The present invention concerns an agrochemical composition comprising: —particles of at least one silicate selected from the group consisting of tourmalines; —at least a guar. The invention also concerns a method for treating a plant wherein a composition as described above is applied onto at least one part of said plant.

22 Claims, No Drawings

AGROCHEMICAL COMPOSITION

SUMMARY

The present invention concerns an agrochemical composition comprising at least one guar and particles of at least one specific silicate.

BACKGROUND

Agrochemical compositions comprising mineral components such as silicates are already known in the prior art.

As far as seed treatments are concerned, to satisfy the need to improve the germination rate and the crop yield but also the enhancement of growth of the obtained plant, notably to develop and increase its biomass, polysaccharides have been used, as disclosed in WO2014/005555. Those seed treatments increase the growth of a plant, notably by developing its biomass, increase the number of pods, the weight of grains and size, the length of roots and the general yield of produced plants, even in conditions wherein irrigation is insufficient.

In addition, patent application CN 102726613 A discloses a nutrient solution for plants under the form of an aqueous composition containing chitin as well as different mineral ingredients including tourmaline powder and magnetite powder.

Such a composition is used as seed dressing agent with the aim of increasing the germination rate and is further described as a fertilizer and growth promoter.

Plant, soil and seed treatments are used on almost every commercial crop on the market today.

There is a continuous need for providing improved compositions for agriculture needs. Such compositions shall fulfill multiple different needs such as promote germination and plant growth, help increasing agriculture yields, and protect the plants against harmful parasites such as in particular fungi.

BRIEF DESCRIPTION

The inventors of the present application have now discovered that a composition comprising particles of a specific silicate combined with a particular family of polysaccharides exhibits synergistic properties that make it particularly efficient when used in agrochemistry.

The present invention thus concerns an agrochemical composition comprising:
  particles of at least one silicate selected from the group consisting of tourmalines; and
  at least one guar.

It is also an object of the present invention to propose a process for the preparation of the above agrochemical composition, wherein the at least one guar, and the particles of at least one silicate selected from the group consisting of tourmalines, are mixed together.

The present invention also concerns the use of such a composition for treating a plant, as well as a method for treating a plant wherein such a composition is applied onto at least one part of said plant.

Last, the present invention is also related to a kit for treating a plant, said kit comprising a first composition comprising particles of at least one silicate selected from the group consisting of tourmalines, and a second composition comprising at least one guar.

The composition of the present invention has demonstrated a synergistic effect on the total protein increase for both seed coating and foliar treatments. This means that the plants will be inclined to grow faster and with improved yields.

Furthermore, such a composition allows a significant increase in the antioxidant activity of plants when used in seed coating as well as foliar treatments. The oxidative stress is reduced. When herbicides are used, the composition of the invention also helps reducing the phytotoxicity thereof.

In addition, the agricultural composition of the invention is still showing unexpected synergistic effects on the above parameters even under hydric stress.

The present invention also relates to a method for treating a plant under hydric stress, wherein an agricultural composition of the invention or a kit of the invention is applied onto at least one part of said plant.

Other subjects, characteristics, aspects and advantages of the invention will emerge even more clearly on reading the description and the examples that follow.

DETAILED DESCRIPTION

Definitions

In the present description, and unless otherwise indicated:
  the expression "at least one" is equivalent to the expression "one or more" and can be replaced therewith;
  the expression "between" is equivalent to the expression "ranging from" and can be replaced therewith and implies that the limits of the range are included;
  the term "compound in CX" designates in a manner known per se a compound having X atoms of carbon in its molecule.

Silicate

The composition of the present invention contains solid particles of one or more silicate(s) selected from the group consisting of tourmalines.

Tourmalines are crystalline boron silicate minerals compounded with elements such as aluminum, iron, magnesium, sodium, lithium, or potassium. We can cite Schorl, Dravite and Elbaite species.

According to a most preferred embodiment, the silicate is selected from the group consisting of tourmalines.

The D90 size of the particles of the silicate preferably ranges from 0.1 to 30 µm, preferably from 0.5 to 20 µm, more preferably from 1 to 15 µm, even more preferably from 2 to 10 µm and most preferably from 5 to 7 µm.

In a manner known per se in the field of particle size analysis, D90 designates the point in the volume size distribution of a population of particles, up to and including which, 90% of the total population is contained. In other words, D90 is defined by the value in the particle size distribution of a sample where 90% of the particles present in the sample are equal of below that value. For example, a sample of particles having a D90 of 1 µm means that 90% by volume of the sample has a size of 1 µm or smaller.

The size distribution of a sample of particles can be measured using the laser diffraction particle size analysis method (using, for example, Malvern or Cilas particle size analyzers). One advantageous way to carry out the process consists in suspending the particles in water and in determining their particle size by laser diffraction using the method described in standard ISO 13320:2009.

The particles of at least one silicate preferably represent from 2 to 78% by weight, more preferably from 5 to 70% by weight, more preferably from 10 to 60% by weight, and even more preferably from 10 to 40% by weight, with regard to the total weight of the composition. The above quantities are defined for the composition before any optional dilution that could be performed before application onto plants.

Guar

As mentioned above, the agrochemical composition according to the invention comprises at least one guar. The expression "guar" is understood to cover guars and guar derivatives, so both expressions are equivalent and can be replaced therewith.

A guar is a polymer of the family of galactomannans. Galactomannans are polysaccharides consisting mainly of the monosaccharides mannose and galactose. The backbone is a linear chain of β 1,4-linked mannose residues to which galactose residues are 1,6-linked at every second mannose in average, forming short side units. Naturally occurring galactomannans are available from numerous sources, including guar gum, guar splits, locust bean gum and tara gum, flame tree gum and cassia gum.

Additionally, galactomannans may also be obtained by classical synthetic routes or may be obtained by chemical modification of naturally occurring galactomannans.

Guar gum refers to the mucilage found in the seed of the leguminous plant *Cyamopsis tetragonolobus*. The water soluble fraction (85%) is called "guaran," which consists of linear chains of (1,4)β-D mannopyranosyl units—with α-D-galactopyranosyl units attached by (1,6) linkages. The ratio of D-galactose to D-mannose in guaran is about 1:2.

In the present application, "native guar" designates macromolecular chains of the galactomannan type, derived from guar endosperm, not having been subjected to chemical modification by the grafting of chemical groups. Native guar comprises macromolecules containing a principal chain of D-mannopyranose units linked in the beta (1-4) position substituted by D-galactopyranose units in the beta (1-6) position. Native guar has a mannose/galactose ratio of about 2. In the present application, "guar gum" designates a product substantially consisting of native guar, in the form of guar splits, or of guar flour or powder.

Processes for making derivatives of guar gum splits are generally known. Typically, guar splits are reacted with one or more derivatizing agents under appropriate reaction conditions to produce a guar polysaccharide having the desired substituent groups. Suitable derivatizing reagents are commercially available and typically contain a reactive functional group, such as an epoxy group, a chlorohydrin group, or an ethylenically unsaturated group, and at least one other substituent group, such as a cationic or nonionic substituent group, or a precursor of such a substituent group per molecule, wherein substituent group may be linked to the reactive functional group of the derivatizing agent by bivalent linking group, such as an alkylene or oxyalkylene group.

According to one embodiment, the guar of the invention is guar gum.

It may be especially guar gum having an average molecular weight (Mw) of between about 2,000 Daltons and 90,000 Daltons. Preferably, the guar gum may have an average molecular weight of between about 5,000 Daltons and 60,000 Daltons, more preferably, the guar gum may have an average molecular weight of between about 5,000 Daltons and 40,000 Daltons, still more preferably, the guar gum may have an average molecular weight of between about 8,000 Daltons and 30,000 Daltons.

As used herein, the "average molecular weight" of the guar means the weight average molecular weight of said guar.

The average molecular weight of the guar gum may be measured by GPC (Gel Permeation Chromatography). Measurements may be carried out using Shodex OH Pak columns and Agilent Refractive Index Detector, for instance with the conditions detailed in the examples.

The guar gum according to the present invention may be prepared by depolymerizing natural guars that have high molecular weight, so as to "split" the guar polymers to desired sizes. Various depolymerisation methods are well known in the art and may be used for the present invention, such as treatment by using peroxo compound (e.g., hydrogen peroxide) and irradiation. Examples of such methods are disclosed in U.S. Pat. Nos. 4,547,571, 6,383,344 and 7,259,192. Various methods for cross-linking guars are also known, see for example U.S. Pat. Nos. 5,532,350 and 5,801,116. Alternatively, low molecular weight guars can be obtained by harvesting guar beans which are still at an early developmental stage such that the harvested guar beans contain low molecular weight natural guar gums.

Advantageously such low molecular weight guar gum may be compliant or suitable for organic farming.

In one embodiment, the present invention also relates to the use of a composition of the invention in organic farming.

In another embodiment, the guar of the invention is preferably a cationic guar, that is to say a guar that is substituted at one or more sites with a substituent group that is a cationic substituent group. Within the context of the present invention, "cationic guar" means a cationic derivative of a guar. "Cationic" means permanently positively charged whatever the pH or non permanently charged, e.g. a derivative that can be cationic below a given pH and neutral above that pH. Notably, the cationic guar is a chemically modified guar derivative that shows or potentially shows a net positive charge in a pH neutral aqueous medium.

The cationic guars usable according to one embodiment of the invention are advantageously chosen in the group consisting of: cationic hydroxyalkyl guars, such as cationic hydroxyethyl guar (HE guar), cationic hydroxypropyl guar (HP guar), cationic hydroxybutyl guar (HB guar), and cationic carboxyalkyl guars including cationic carboxymethyl guar (CM guar), cationic alkylcarboxy guars such as cationic carboxylpropyl guar (CP guar) and cationic carboxybutyl guar (CB guar), carboxymethylhydroxypropyl guar (CMHP guar).

The cationic guars of the present invention can be obtained by chemically modifying guars, generally natural guars, by using cationic etherifying agents. Suitable cationic etherifying agents include primary, secondary or tertiary amino groups or quaternary ammonium, sulfonium or phosphonium groups. Notably, the cationic etherifying agents are quaternary ammonium salts.

Preferably, the cationic etherifying agents are quaternary ammonium salts bearing three radicals, which may be identical or different, chosen from hydrogen, an alkyl radical containing 1 to 22 carbon atoms, more particularly 1 to 14, and advantageously 1 to 3 carbon atoms. Various counter ions can be utilized, including but not limited to halides, such as chloride, fluoride, bromide, and iodide, sulfate, methylsulfate, and mixtures thereof. The counterion is generally a halogen, and in one embodiment is chlorine.

"Alkyl" as used herein means a straight chain or branched saturated aliphatic hydrocarbon group and is intended to include both "unsubstituted alkyl" and "substituted alkyl", the latter of which refers to alkyl moieties having substituents (such as hydroxyl group and halogen group) replacing a hydrogen on one or more carbon atoms of the alkyl group.

In one embodiment, quaternary ammonium salts are chosen in the group consisting of: 3-chloro-2-hydroxypropyl trimethyl ammonium chloride (CHPTMAC), 2,3-epoxypropyl trimethyl ammonium chloride (EPTAC), and diallyldimethyl ammonium chloride (DMDAAC).

A typical cationic functional group in these cationic guars is trimethylammonium (2-hydroxyl) propyl, with a counter ion. Various counter ions can be utilized, including but not being limited to halides, such as chloride, fluoride, bromide, and iodide, sulfate, methylsulfate, and mixtures thereof.

In some aspects, the cationic guar of the present invention is guar hydroxypropyltrimonium chloride or hydroxypropyl guar hydroxypropyltrimonium chloride, notably, guar hydroxypropyltrimonium chloride.

The above statement does not prevent the cationic guar of the invention to be also substituted at one or more sites with additional substituent groups, notably nonionic substituent groups, for instance hydroxyalkyl groups, such as hydroxypropyl groups.

According to the invention embodiments, the guar has typically a weight average molecular weight (Mw) ranging from about 2,000 to about 3,000,000 g/mol. In some embodiments, it can be interesting to target a low molecular weight guar, having an average molecular weight of between 2,000 g/mol and 90,000 g/mol, preferably between about 5,000 and 90,000 g/mol, more preferably between about 5,000 and 60,000 g/mol, still more preferably between about 5,000 and 50,000 g/mol, notably of between about 5,000 and 40,000 g/mol. The average molecular weight of the cationic guar of the invention may be measured for instance by SEC-MALS or by using gel permeation chromatography. The guar of the invention may be treated with a crosslinking agent, such for example, borax (sodium tetra borate) is commonly used as a processing aid in the reaction step of the water-splits process to partially crosslink the surface of the guar splits and thereby reduces the amount of water absorbed by the guar splits during processing. Other crosslinkers, such as, for example, glyoxal or titanate compounds, are known.

The amount of derivatizing groups in a derivatized guar polymer may be characterized by the degree of substitution of the derivatized guar polymer or molar substitution of the derivatized polysaccharide polymer.

The Degree of Substitution (DS) of cationic guars, that is the average number of hydroxyl groups that have been substituted by a cationic group per monosaccharide unit, may be comprised between 0.001 and 3, preferably 0.005 and 3, more preferably between 0.01 and 2. DS may notably be determined by titration. In one preferred embodiment, the cationic guar of the present invention has a DS of between 0.12 and 0.5.

The degree of hydroxyalkylation (molar substitution or MS) of guars, that is the number of alkylene oxide molecules consumed by the number of free hydroxyl functions present on the guar, may be comprised between 0.001 and 3, preferably between 0.001 and 1.7. As example, a MS of 1 may represent one ethylene oxide unit per monosaccharide unit.

According to an embodiment, the degree of hydroxyalkylation (molar substitution or MS) of cationic guars is comprised between 0.1 and 1.7, preferably between 0.2 and 1.0.

The Charge Density (CD) of cationic guars may be comprised between 0.01 and 4.9 meq/g, preferably between 0.4 and 2.1 meq/g. The charge density refers to the ratio of the number of positive charges per gram of polymer. For example, CD=1 meq/g means there are 0.001 charges per gram of polymer. The charge density multiplied by the polymer molecular weight determines the number of positively charged sites on a given polymer chain.

In one embodiment, the guar of the invention may further contain hydrophobic substituents.

The hydrophobic modification of a guar of the invention may be obtained by the introduction of hydrophobic group.

Typical derivatizing agents bringing a hydrophobic group include C2-C24 linear or branched alkyl and alkenyl halides, or C6-C24 linear or branched alkyl and alkenyl epoxides and alkyl and alkenyl glycidyl ethers containing a C4-C24 linear or branched hydrocarbon group.

A hydrophobically modified guar of the invention may have hydrophobic degree of substitution ranging from $1*10^{-5}$ to $5*10^{-1}$, preferably from $1*10^{-4}$ to $1*10^{-1}$.

In one embodiment, a hydrophobically modified guar of the invention contains as hydrophobic groups C4-C24 alkyl chains. The hydrophobizing agent is preferably a alkyl or alkenyl glycidylether containing a C4-C24 linear or branched hydrocarbon group.

After the preparation, the guar of the invention can be treated with several known reagents, for example: caustic; acids; biochemical oxidants, such as galactose oxidase; chemical oxidants, such as hydrogen peroxide; and enzymatic reagents; or by physical methods using high-speed agitation machines; thermal methods; and combinations of these reagents and methods. Reagents such as sodium metabisulfite or inorganic salts of bisulfite may also be optionally included.

The treatments described here above can be also performed on the guar of the invention before the derivatization process.

According to another one of the invention embodiments, the guar of the invention is a cationic guar, having a cationic degree of substitution DScat comprised between about 0.01 and about 0.20, a hydroxyalkyl molar substitution comprised between about 0.1 and about 1 and a weight average molecular weight comprised between about 500,000 g/mol and about 2,000,000 g/mol.

In a preferred embodiment, the guar is a depolymerized guar, which has been depolymerized by using chemicals, such as hydrogen peroxide, or cellulase enzymes.

Methods for the preparation of a guar of the invention are disclosed for instance in U.S. Pat. Nos. 4,663,159; 5,473,059; 5,387,675; 3,472,840; 4,031,307; 4,959,464 and US 2010/0029929, all of which are incorporated herein by reference.

According to another one of the invention embodiments, the guar of the invention is a cationic guar derivative, having a cationic degree of substitution DScat comprised between about 0.01 and about 0.40, a hydroxyalkyl molar substitution comprised between about 0.1 and about 1 and a weight average molecular weight comprised between about 2,000 g/mol and about 90,000 g/mol.

The cationic guar according to the present invention may be prepared by depolymerizing cationically modified guars that have high molecular weight, so as to "split" the guar polymers to desired sizes. It is appreciated that the cationic guar of the present invention may also be prepared by depolymerisation of natural guars, followed by cationization reactions to provide the polymers with cationic functionality. Various depolymerisation methods are well known in the art and may be used for the present invention, such as treatment by using peroxo compound (e.g., hydrogen peroxide) and irradiation. Examples of such methods are disclosed in U.S. Pat. Nos. 4,547,571, 6,383,344 and 7,259,192.

The cationization of guars can be easily made by a skilled person using methods commonly known in the art. Various methods for providing guar gums with cationic functionality are known in the art, for example as disclosed in U.S. Pat. Pub. No. 2008/0112907. Various methods for cross-linking guars with and without cationic modification of the guars are also known, see for example U.S. Pat. Nos. 5,532,350 and 5,801,116. Alternatively, low molecular weight guars can be obtained by harvesting guar beans that are still at an early developmental stage such that the harvested guar beans contain low molecular weight natural guar gums. Then the guar gums may be subject to cationization to provide them with cationic functionality.

Additional polysaccharides can be added like chitosan, pectin, alginate, hyaluronic acid, agar, xanthan, dextrin, starch, cellulose, amylose, amylopectin, alternan, gellan, levan, mutan, dextran, pullulan, fructan, gum arabic, carrageenan, glycogen, glycosaminoglycans, murein, xyloglucans and bacterial capsular polysaccharides. Those additional polysaccharide polymers can be substituted by cationic groups, for instance xanthans, polyfructoses such as levan, starches, including starch derivatives, such as amylopectin, xyloglucans such as tamarind gum and tamarind gum derivatives such as hydroxypropyl tamarind gum, and cellulose, including cellulose derivatives, such as methylcellulose, ethylcellulose, carboxymethylcellulose, hydroxyethylcellulose, cellulose acetate, cellulose acetate butyrate, and cellulose acetate propionate.

The composition of the invention may comprise from 2 wt % to 60 wt % of the guar based on the total weight of the composition. Preferably, the composition comprises from 5 wt % to 50 wt % of the guar based on the total weight of the composition. In some aspects, the composition comprises from 5 wt % to 35 wt % of the guar based on the total weight of the composition.

The guars may be in solid or liquid form.

In the case wherein the guar is solid, it may be in the form of a powder, a particle, an agglomerate, a flake, a granule, a pellet, a tablet, a brick, a paste, a block such as a molded block, a unit dose, or another solid form known to those of skill in the art. Preferably, it is in the form of a powder or a granule.

In some aspects, the guar is in the form of a granule. Granules containing the cationic guar may be prepared in a three-step procedure: wet granulation followed by drying and sieving. The wet granulation step notably involves introduction and mixing of cationic guar powders and a carrier, and optionally other ingredients, in granulation equipment (such as a mixing granulator). The mixing is conducted with spraying of water to the mixture. The wet granulation step will yield wet granules containing the cationic guars. The weight ratio between the carrier and the guar which are to be mixed may be between 20:1 to 1:1, preferably, between 20:1 to 10:1. The water content introduced may be comprised between 10 wt % to 50 wt % based on the total weight of the wet granules. The carrier may be silicon dioxide, amorphous silica, precipitated silica, hydrated amorphous silica, precipitated silica, hydrophobized precipitated silica, silica gel, sodium carbonate, sodium bicarbonate, sodium sulfate, sodium tripolyphosphate, sodium chloride, magnesium chloride, calcium chloride, ammonium chloride, magnesium sulfate, calcium carbonate, calcium oxide, and/or calcium sulphate, or a mixture thereof. Notably, the carrier is selected from calcium chloride and calcium carbonate. The drying step notably involves drying the wet granules by using hot air flow. This step can usually be conducted in a fluid bed equipped with an air inlet and an air outlet. The sieving step may be conducted by using a vibrating plate.

The granules may have a diameter of 0.1 to 6 mm. Generally, normal granules have a diameter of 2-6 mm and micro granules have a diameter of 0.1-2 mm. Preferably, micro granules having a diameter of 0.5-1.6 mm are used.

Alternatively, the granules containing the guar may be prepared by using extrusion methods well known by a person skilled in the art. The extrusion methods are described in U.S. Pat. No. 6,146,570. For example, the guar and the carrier, and optionally other ingredients, may be blended with heating. The weight ratio between the carrier and the guar may be between 20:1 to 1:1. Then a binder may be melted and introduced into the mixture of the guar and the carrier. Then, an extrusion step may be carried out with extruder temperature maintained between 55° C. and 65° C. The soft warm granules may be formed and may be subsequently cooled below solidification point of the molten binder (at room temperature for instance) in order to obtain solid granules.

When the guar is liquid, it is in fact a liquid composition containing it. It may be a suspension, a dispersion, a slurry, a solution in a liquid carrier selected from water, organic solvents oils or a mixture thereof. The liquid composition may be prepared by mixing the guars as described above with the liquid carrier, optionally with other components, by using conventional methods. Preferably, the liquid composition is in the form of an aqueous solution. Such liquid composition of guar (aqueous solution of guar) may comprise from 2 wt % to 70 wt % of the guar based on the total weight of this liquid composition. Preferably, the composition comprises from 10 wt % to 50 wt % of the guar based on the total weight of this liquid composition. In some aspects, the composition comprises from 20 wt % to 50 wt % of the guar based on the total weight of this liquid composition. When conducting seed treatment in industrial scale, it is preferred that the liquid composition used for the seed treatment contains high concentration of the guar, so that less volume of the liquid composition is required to achieve the desired dosage for the treatment (i.e. the weight ratio of the guar to the seeds being treated). Using small volume of the liquid composition can save costs and is less tedious. However, when the concentration of the guar in the liquid composition increases, the fluidity of the liquid composition will significantly decrease. As a result, the liquid composition may become too "thick" to be effectively applied to the seed, the soil, or as foliar spray and has poor ability to spread on the surface of the seed, in the soil and as foliar application as well. For example, an aqueous composition comprising 3 wt % of a high molecular weight cationic guar may already be very thick and thus have poor fluidity. One advantage of one embodiment of the present invention is that one of the guar according to the present invention has relatively low molecular weight (2,000-90,000 g/mol). In such case, the resulting liquid composition can maintain excellent fluidity even if the guar is present at high concentrations, and therefore, such liquid composition can be conveniently used for a further seeds or soil treatment without issue. According to a preferred embodiment, the guar of low molecular weight (2,000-90,000 g/mol) as defined above is used in a liquid form.

Other Ingredients

Fungicide(s)

The composition of the invention may further contain one or more fungicide(s) chosen from the group consisting of strobilurin fungicides, triazole fungicides, dithio-carbamate fungicides, succinate dehydrogenase inhibitors, biofungicides, and mixtures thereof.

Among the strobilurin fungicides useful in the present invention, azoxystrobin and pyraclostrobin are especially preferred.

Among the triazole fungicides, prothioconazole and epoxiconazole are preferred.

Among the dithio-carbamate fungicides, mention can be made in particular of mancozeb.

The succinate dehydrogenase inhibitors useful in the present invention are especially chosen from pyrazole-carboxamide fungicides. Among the latter ones, fluxapyroxad, benzovindiflupyr and bixafen are preferred.

The biofungicides are bacteria having antifungal properties. Among them, mention shall be made in particular of *Bacillus subtilis*.

According to a preferred embodiment, said one or more fungicide(s) is chosen from the group consisting of strobilurin fungicides, triazole fungicides, succinate dehydrogenase inhibitors, and mixtures thereof, more preferably from pyrazole-carboxamide fungicides, even more preferably from fluxapyroxad, benzovindiflupyr, bixafen and mixtures thereof, and most preferably fluxapyroxad.

The composition of the invention preferably contains said one or more fungicide(s) in a total amount ranging from 0.1 to 50 g/L, preferably from 0.5 to 30 g/L, and more preferably from 0.7 to 10 g/L. These amounts are expressed in total weight of fungicide(s) per volume (L) of said composition.

Fungicides are generally added when preparing the ready to use composition before application onto the plant.

Carrier

Advantageously, the agrochemical composition of the invention is a liquid composition. In this case, a liquid carrier is used. The carrier of the composition of the invention is liquid at ambient temperature (25° C.) and atmospheric pressure ($1,013.10^5$ Pa).

According to one embodiment of the invention, the composition is under the form of a suspension of said solid particles within the liquid carrier.

The composition of the invention may advantageously contain an aqueous liquid carrier that is to say the carrier contains water. The carrier can be made of water, or of water mixed with one or more organic fluid(s) which can be water-miscible or not.

When the carrier contains water and one or more water-immiscible organic fluid(s), said carrier may be in the form of an emulsion.

The organic fluids can be for example chosen from natural or synthetic oils, in particular mineral oils, vegetable oils, fatty or non fatty alcohols, fatty acids, esters containing at least one fatty acid and/or at least one fatty alcohol.

The fatty alcohols and fatty acids mentioned above are those which contain from 8 to 32, preferably from 10 to 26 and more preferentially from 12 to 22 carbon atoms.

The organic fluids when used are preferably water-miscible in any proportions. They can in particular be chosen from mono-alcohols containing from 2 to 5 carbon atoms, such as ethanol and isopropanol and from polyols such as, in particular, glycol, glycerol, saccharides such as sorbitol.

In a particularly preferred embodiment, an organic fluid that is advantageously a mineral oil or soya oil methyl ester is used, as an adjuvant for the fungicide(s) in the composition according to the invention.

It is of course possible to use mixtures of organic fluids and in particular any mixtures of any of the fluids described above.

According to one particularly preferred embodiment, the carrier of the composition used in the present invention is water.

The composition advantageously contains at least 20% by weight of water, more preferentially at least 30% by weight of water, more preferentially at least 40% by weight of water, and even more preferentially at least 50% by weight of water, relative to the total weight of said composition.

When one or more organic fluids are present, the composition preferably contains from 0.5% to 20% by weight of organic fluid(s), more preferentially from 1% to 10% by weight of organic fluid(s), relative to the total weight of said composition.

Other Minerals

The composition of the present invention may further contain particles of one or more additional mineral compound(s).

The additional mineral compounds usable according to the invention can be chosen in particular from oxides, sulfates, carbonates, and phosphates.

The oxides can advantageously be chosen from titanium dioxide, silicon dioxide and magnesium oxide.

The sulfates are advantageously chosen from alkali metal and alkaline-earth metal sulfates, preferably from barium sulfate, calcium sulfate and strontium sulfate.

According to a particularly preferred embodiment of the invention, use is made of particles of barium sulfate.

The carbonates are advantageously chosen from calcium carbonate and sodium carbonate.

The phosphates can be chosen from zirconium phosphates, cerium phosphate and apatite, and mixtures thereof.

When they are present, said one or more additional mineral compound(s) are preferably used under the form of particles which are distinct from said particles of silicate. In this case, the D90 size of the particles of additional mineral compound(s) preferably ranges from 0.1 to 30 μm, preferably from 0.5 to 20 μm, more preferably from 1 to 15 μm, even more preferably from 2 to 10 μm and most preferably from 3 to 4 μm.

The particles of said one or more additional mineral compound(s) can represent from 5 to 40% by weight, more preferably from 6 to 35% by weight, even more preferably from 7 to 30% by weight, with regard to the total weight of the composition.

In one embodiment, an agrochemical composition of the invention does not comprise urea. In particular, the present invention does not encompass formulations useful for coating urea, and the resulting coated urea.

Surfactants

The composition used in the present invention may further contain one or more surfactants.

These surfactants are preferably chosen from the group consisting of betaines, amine oxides, ethoxylated fatty amines, fatty amines, ether carboxylates, acid or non acid mono- and di-ester phosphates, optionally polyalkoxylated, alkyl-monoglycosides, alkylpolyglycosides, and mixtures thereof.

The betaine surfactants are in particular those described in WO2006/069794. Preferably, the betaine surfactants are chosen from the betaines having formula $R^1R^2R^2N^+$—$CH_2COO^-$ (I), the betaines having formula $R^1$—CO—NH—

$R^4R^2R^2N^+$—$CH_2COO^-$(II), and mixtures thereof, wherein the $R^1$ group is a linear or branched hydrocarbon group, preferably an alkyl group containing 2 to 30 carbon atoms, preferably 2 to 24 carbon atoms, preferably 3 to 20 carbon atoms; the $R^2$ groups which are identical or different, are a C1-C3 alkyl group, preferably a methyl group, and the $R^4$ group is a divalent linear or branched hydrocarbon group containing 1 to 6 carbon atoms, optionally substituted with a hydroxyl group, preferably a group of formula —$CH_2$—$CH_2$—$CH_2$—or —$CH_2$—$CHOH$—$CH_2$—.

Preferably, in formulae (I) and (II) above, $R^2$ is a methyl group. $R^1$ is preferably an alkyl group. This group is usually a mixture of different groups having different numbers of carbon atoms, being linear or branched, and optionally having some insaturations. These mixtures come from the reagents used to prepare them, which are actually distillation cuts and/or have a natural origin. In the present specification, the number of carbon atoms in the $R^1$ group refers to the number of carbon atoms of the two most represented species.

The preferred betaine surfactants are those wherein $R^2$ is a methyl group, $R^1$ is a lauryl alkyl group mixture, preferably having more than 50% by weight of C12 and $R^4$ if present is —$CH_2$—$CH_2$—$CH_2$—.

Betaines of formula (I) are preferred. They are often referred to as alkyl betaines, and are preferably an alkyldimethyl betaine based surfactant, for example lauryl dimethyl betaine based surfactant ($R^2$ is a methyl group and $R^1$ is a lauryl C12 group).

Betaines of formula (II) are often referred to as alkyl amidoalkyl betaines.

The amine oxide surfactants which may be used as surfactants in the present invention are in particular those described in WO2006/069794.

The amine oxides surfactants which may be used can be chosen from the amine oxides having formula $R^1R^2R^2N{\rightarrow}0$ (III), the amine oxides having formula $R^1$—CO—NH—$R^4R^2R^2N{\rightarrow}0$ (IV), and mixtures thereof, wherein $R^1$, $R^2$ and $R^4$ are as described in formulae (I) and (II) above.

In formulas (III) and (IV) above, the $R^2$ group is preferably a methyl group. $R^1$ is preferably an alkyl group. This group is usually a mixture of different groups having different numbers of carbon atoms, being linear or branched, and optionally having some insaturations. These mixtures come from the reagents used to prepare them, which are actually distillation cuts and/or have a natural origin. In the present specification, the number of carbon atoms in the $R^1$ group refers to the number of carbon atoms of the two most represented species.

The preferred amine oxide surfactants are those wherein $R^2$ is a methyl group, $R^1$ is a lauryl alkyl group mixture, preferably having more than 50% by weight of C12 and $R^4$ if present is —$CH_2$—$CH_2$—$CH_2$—.

Amine oxides of formula (III) are preferred. They are often referred to as alkyl amine oxides, and are preferably an alkyldimethyl amine oxide based surfactant, for example lauryl dimethyl amine oxide based surfactant ($R^2$ is a methyl group and $R^1$ is a lauryl C12 group).

Amine oxides of formula (IV) are often referred to as alkyl amidoalkyl amine oxides.

The fatty amines or ethoxylated fatty amines useful as surfactants in the present invention may comprise at least one hydrocarbon group containing 2 to 24 carbon atoms, optionally polyalkoxylated.

The fatty amines or ethoxylated fatty amines may more particularly be selected from amines comprising at least one linear or branched, saturated or unsaturated group containing 2 to 24 carbon atoms, preferably 8 to 18 carbon atoms, optionally comprising 2 to 30 oxyethylene groups, or a mixture of a plurality thereof. Examples include ethoxylated tallow amines. The fatty amines or ethoxylated fatty amines may be selected from ethoxylated fatty amines comprising at least one or several, linear or branched, saturated or unsaturated, group(s) containing 6 to 24 carbon atoms, preferably 8 to 20 carbon atoms, comprising 2 to 30 oxyethylene groups, or mixtures thereof.

Examples include the compounds having the following formula (V):

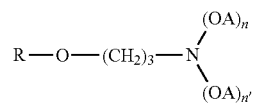

wherein R represents a linear or branched, saturated or unsaturated hydrocarbon group containing 6 to 24 carbon atoms, preferably 8 to 20 carbon atoms; OA represents an oxyalkylene group; and n, n', which may or may not be identical, represent a mean number in the range 1 to 30.

Examples of such amines to be cited are amines derived from copra and containing 5 oxyethylene (OE) units, oleic amines containing 5 OE, amines derived from tallow containing 5 to 20 OE, for example 10 OE, compounds corresponding to the above formula in which R is an alkyl group containing 12 to 15 carbon atoms and the total number of OE units is in the range 20 to 30.

The ether carboxylates useful as surfactants in the present invention preferably have the following formula (VI): $R(OCH_2CH_2)_nOCH_2CO_2$, wherein R is a linear or branched alkyl, alkenyl, alkylphenyl or polypropyleneoxy group having from 6 to 20, for example 8 to 14, aliphatic carbon atoms and n is a number ranging of from 1 to 30, preferably of from 2 to 20. The ether carboxylate has preferably a counter ion being ammonium or potassium, or obtained from an amine or alkanolamine having up to 6 carbon atoms.

The optionally polyalkoxylated acid or non acid mono- and di-ester phosphates useful as surfactants in the present invention are selected from acid or non acid phosphate mono- or di-esters, optionally polyalkoxylated, having the following formula (VII):

$$(A)_{3-m}P(=O)(OM)_m$$

wherein:

A, identical or different, represents a group $R'^1$—O(CH2-CHR'^2—O)n wherein:

$R'^1$ represents a linear or non linear, saturated or unsaturated C6-C20 hydrocarbon group, preferably C8-C18;

$R'^2$ represents a hydrogen atom or a methyl or ethyl group, preferably a hydrogen atom;

n is a mean number of motifs in the range 0 to 10, preferably in the range 2 to 10;

M represents a hydrogen atom, an alkali or alkaline-earth metal, a $N(R^3)_4^+$ type radical wherein the $R^3$ groups, identical or different, represents a hydrogen atom or a linear or non linear, saturated or unsaturated C1-C6 hydrocarbon group optionally substituted with a hydroxyl group;

m is a whole or average number in the range 1 to 2.

The acid or non acid mono- and di-ester phosphate, optionally polyalkoxylated may be in the form of a monoester, a diester, or a mixture of these two esters.

The preferred surfactants are chosen from anionic surfactants such as ether carboxylates, optionally polyalkoxylated acid or non acid mono- and di-ester phosphates, and mixtures thereof.

When the composition used in the present invention comprises one or more surfactants, the total amount of said surfactant(s) preferably ranges from 0.5 to 20% by weight based on the total weight of the composition.

Thickening Agents

According to a preferred embodiment, the composition of the present invention further contains one or more thickening agent(s).

Suitable thickening agent can be in particular chosen from polysaccharides such as for example xanthan gum, alginates, carboxylated or hydroxylated methylcelluloses, synthetic macromolecules of the polyacrylate, polymaleate, polyvinylpyrrolidone, polyethylene glycol or polyvinyl alcohol type.

When the composition comprises one or more thickening agents, the total amount of thickening agent(s) preferably ranges from 0.05 to 5% by weight, preferably from 0.1 to 2% by weight, based on the total weight of the composition.

Dispersants

According to a preferred embodiment, the composition of the present invention further contains one or more dispersant (s). Suitable dispersants include in particular polycarboxylate polymers such as sodium polycarboxylate.

When the composition comprises one or more dispersant (s), the total amount thereof preferably ranges from 0.05 to 20%, preferably from 0.1 to 15% by weight, more preferably from 1 to 10% by weight, based on the total weight of the composition.

Fertilizers or Nutrients

The composition according to the present invention may further contain one or more fertilizers, preferably chosen from water-soluble fertilizers such as for example foliar fertilizers (fertilizers which are taken up by the leaves of the plants), such as urea or foliar macro- or microelement fertilizer, including chelates. Fertilizers are generally used for foliar and soil applications.

The composition according to the present invention may further contain one or more nutrients, such as algae extract, aminoacids, cobalt, molybdenum, micronutrients. Nutrients are generally used for seed coating applications.

Others

The composition may further contain additional ingredients, which can be chosen from all additives and adjuvants useful in agrochemical compositions such as for example nutrients, anti-foaming agents, colorants such as pigments, etc. . .

According to a preferred embodiment, the composition of the present invention does not contain any xyloglucan polymer or oligomer.

All the amounts above are defined considering a "concentrated" composition, that is to say that the above composition according to the invention can be diluted or not before an application onto the crop. It is preferred to dilute said composition for foliar spray onto the leaves of the plant. For use in the soil or onto the seeds, a dilution is generally not performed, but the composition can be mixed together with other compositions (e.g. fungicide compositions, nutrient compositions, etc, which generally contain a liquid carrier).

Notably for foliar application, it is thus also an object of the present invention a ready-to-use composition of the invention and in this case all the above amounts (percentage by weight based on the total weight of the concentrated composition) would be divided by from 10 to 500, preferably by 50 to 200 and notably by around 100. In this embodiment, the concentrated composition would be diluted just before application and the additional ingredients like fungicides, fertilizers and/or nutrients are generally added at this dilution moment. The dilution would thus be from 10 to 500, preferably by 50 to 200 and notably by around 100.

Process Preparation

The composition according to the invention can be prepared by simple mixing of the ingredients, i.e
  particles of at least one silicate selected from the group consisting of tourmalines;
  at least one guar.
  A liquid carrier is generally also added.

To prepare the "concentrated" composition, that is to say a composition with the above described ranges of amounts of ingredients, without further dilution, the ingredients can be mixed in any order. This composition can also be in the form of a kit for treating a plant, said kit comprising a first composition comprising particles of at least one silicate selected from the group consisting of tourmalines, and a second composition comprising at least one guar.

In this case of a kit the first composition is obtained by mixing the particles of at least one silicate with the liquid carrier, preferably water and optionally fungicides, surfactants, dispersants, thickening agents. The second composition is either a liquid or solid composition comprising at least one guar. In the case of a liquid second composition, the at least one guar is advantageously mixed into a liquid carrier, preferably water.

For the ready-to-use composition according to the invention for a foliar application on crop, the process is preferably the following: to a defined volume of water (depending on the surface of crop to be treated), the at least one guar in liquid form (suspension in water) is added, then or at the same moment the one or more fungicide(s) list above is(are) added and optionally an organic fluid that is advantageously a mineral oil or soya oil methyl ester. Then the particles of the above defined at least one silicate, preferably in the form of an aqueous suspension, are added. Alternatively, to a defined volume of water (depending on the surface of crop to be treated), the at least one guar in liquid form (solution in water) is added, then or at the same moment the particles of the above defined at least one silicate, preferably in the form of an aqueous suspension, are added, followed or together with the one or more fungicide(s) list above and optionally an organic fluid that is advantageously a mineral oil or soya oil methyl ester.

For the composition according to the invention for a seed coating application, there is no specific order of addition of the ingredients. It can be for instance first an insecticide, then a fungicide, then the particles of the above defined at least one silicate, preferably in the form of an aqueous suspension, then the at least one guar in liquid form.

When the guar is in solid form a solution is prepared by adding first an insecticide, then a fungicide, and then the particles of the above defined at least one silicate, preferably in the form of an aqueous suspension. This solution is applied onto the seeds and the powder of the at least one guar is then added.

Method for Treating a Plant

The present invention also concerns a method for treating a plant wherein a composition as described above is applied onto at least one part of said plant.

The composition described above can be either applied as such directly onto the plant, or it can be diluted just before application for example with a liquid diluent comprising water or a mixture of water and organic solvent, or it can be mixed just before application with another agrochemical composition.

Plants

The method of the present invention can be implemented on any type of plant. The plants are preferably chosen among agricultural and horticultural plants, shrubs, trees and grasses.

The plant species include but are not limited to corn (*Zea mays*), *Brassica* sp. (e.g., *B. napus, B. rapa, B. juncea*), alfalfa (*Medicago sativa*), rice (*Oryza sativa*), rye (*Secale cereale*), sorghum (*Sorghum bicolor, Sorghum vulgare*), millet (e.g., pearl millet (*Pennisetum glaucum*), proso millet (*Panicum miliaceum*), foxtail millet (*Setaria italica*), finger millet (*Eleusine coracana*)), sunflower (*Helianthus annuus*), safflower (Carthamus tinctorius), wheat (*Triticum aestivum*), soybean (*Glycine max*), tobacco (*Nicotiana tabacum*), potato (*Solanum tuberosum*), peanuts (*Arachis hypogaea*), cotton (*Gossypium barbadense, Gossypium hirsutum*), sweet potato (*Ipomoea batatus*), cassava (*Manihot esculenta*), coffee (*Cofea* spp.), coconut (*Cocos nucifera*), pineapple (*Ananas comosus*), citrus trees (*Citrus* spp.), cocoa (*Theobroma cacao*), tea (*Camellia sinensis*), banana (*Musa* spp.), avocado (*Persea americana*), fig (*Ficus casica*), guava (*Psidium guajava*), mango (*Mangifera indica*), olive (*Olea europaea*), papaya (*Carica papaya*), cashew (*Anacardium occidentale*), macadamia (*Macadamia integrifolia*), almond (*Prunus amygdalus*), sugar beets (*Beta vulgaris*), sugarcane (*Saccharum* spp.), canola, oats, barley, vegetables, ornamentals, woody plants such as conifers and deciduous trees, squash, pumpkin, hemp, zucchini, apple, pear, quince, melon, plum, cherry, peach, nectarine, apricot, strawberry, grape, raspberry, blackberry, soybean, sorghum, sugarcane, rapeseed, clover, carrot, and *Arabidopsis thaliana*.

Further examples of plants include tomatoes (*Lycopersicon esculentum*), lettuce (e.g., *Lactuca sativa*), green beans (*Phaseolus vulgaris*), lima beans (*Phaseolus limensis*), peas (*Lathyrus* spp.), cauliflower, broccoli, turnip, radish, spinach, cabbage, asparagus, onion, garlic, pepper, celery, and members of the genus *Cucumis* such as cucumber (*C. sativus*), cantaloupe (*C. cantalupensis*), and musk melon (*C. melo*).

Mention can further be made of ornamentals species including but not limited to hydrangea (*Macrophylla hydrangea*), hibiscus (*Hibiscus rosasanensis*), petunias (*Petunia hybrida*), roses (*Rosa* spp.), azalea (*Rhododendron* spp.), tulips (*Tulipa* spp.), daffodils (*Narcissus* spp.), carnation (*Dianthus caryophyllus*), poinsettia (*Euphorbia pulcherrima*), and chrysanthemum; and of conifer species including but not limited to conifers pines such as loblolly pine (*Pinus taeda*), slash pine (*Pinus elliotii*), ponderosa pine (*Pinus ponderosa*), lodgepole pine (*Pinus contorta*), and Monterey pine (*Pinus radiata*), Douglas-fir (*Pseudotsuga menziesii*); Western hemlock (*Tsuga canadensis*); Sitka spruce (*Picea glauca*); redwood (*Sequoia sempervirens*); true firs such as silver fir (*Abies amabilis*) and balsam fir (*Abies balsamea*); and cedars such as Western red cedar (*Thuja plicata*) and Alaska yellow-cedar (*Chamaecyparis nootkatensis*).

In one embodiment, the plant is chosen from leguminous plant species including but not limited beans and peas. Beans include guar, locust bean, fenugreek, soybean, garden beans, cowpea, mungbean, lima bean, fava bean, lentils, chickpea, green pea, moth bean, broad bean, kidney bean, lentil, dry bean, etc. Legumes include, but are not limited to, Arachis, e.g., peanuts, Vicia, e.g., crown vetch, hairy vetch, adzuki bean, mung bean, and chickpea, Lupinus, e.g., lupine, trifolium, *Phaseolus*, e.g., common bean and lima bean, Pisum, e.g., field bean, Melilotus, e.g., clover, *Medicago*, e.g., alfalfa, *Lotus*, e.g., trefoil, lens, e.g., lentil, and false indigo. Typical forage and turf grass for use in the methods described herein include but are not limited to alfalfa, orchard grass, tall fescue, perennial ryegrass, creeping bent grass, lucerne, birdsfoot trefoil, clover, *Stylosanthes* species, *Lotononis bainessii*, sainfoin and redtop. Other grass species include barley, wheat, oat, rye, orchard grass, guinea grass, sorghum or turf grass plant.

According to a preferred embodiment, the plant is selected from the group consisting of soy, cane, cotton, wheat, beans, rice, and preferably the plant is soy.

The composition of the invention can be applied on the plant at any stage of its development. It can be applied on the whole plant or on parts thereof

Foliar Application

According to a preferred embodiment, the composition is applied onto the foliar system of the plant. Such application is preferably carried out by spraying a composition as disclosed above onto the leaves of the plant. For example, the composition can be sprayed onto a field using appropriate means well known in agriculture.

In a general manner, the composition of the invention can be easily applied onto plants or parts thereof using any conventional and commercially available application equipment.

Seed Coating

In one embodiment, the method of the present invention comprises a step in which the seed is coated with the composition as described above. Then the coated seed may be applied onto or in the soil, notably, in order to set in contact the coated seed with the ground.

Suitable coating techniques may be utilized to coat the seed or agglomeration of the seeds with the composition according to the present invention. Equipment that may be utilized for coating can include but are not limited to drum coaters, rotary coaters, tumbling drums, fluidized beds and spouted beds. It is appreciated that any suitable equipment or technique known by a person skilled in the art may be employed. The seed may be coated via a batch or continuous coating process. The seed may be coated with the composition according to the present invention which is either in solid form or liquid form. Preferably, an aqueous dispersion or solution is used.

The seeds may be separated prior to the coating step. In one embodiment, mechanical means, such as a sieve, may be employed for separating the seeds. The separated seeds can then be introduced into a coating machine having a seed reservoir. In one embodiment, the seeds are combined with the composition described herein, optionally with a binder and/or adhesive, in a mixing bowl.

In some aspects, one or more layers of coating which comprises the composition according to the present invention may be added onto the seeds or the agglomeration thereof. Outer layers can be introduced sequentially by coating the seeds or the agglomeration thereof in a rotating drum.

Agglomerators or agglomerator devices may also be utilized. Coating may be performed within a rotary coater by placing the seeds within a rotating chamber, which pushes the seeds against the inside wall of the chamber. Centrifugal forces and mixing bars placed inside the coater allow the seeds to rotate and mix with a coating layer comprising the composition according to the present invention. Binder or other coating materials can be pumped into the proximate center of the coater onto an atomizer disk that rotates along with the coating chamber. Upon hitting the atomizer disk, liquid adhesive is then directed outward in small drops onto the seeds.

Seed coating techniques also include, for example, placing the seeds in a rotating pan or drum. The seeds are then mist with water or other liquid, and then gradually a fine inert powder, e.g., diatomaceous earth, is added to the coating pan. Each misted seed becomes the center of a mass of powder, layers, or coatings that gradually increases in size. The mass is then rounded and smoothed by the tumbling action in the pan, similar to pebbles on the beach. The coating layers are compacted by compression from the weight of material in the pan. Binders often are incorporated near the end of the coating process to harden the outer layer of the mass. Binders can also reduce the amount of dust produced by the finished product in handling, shipping and sowing. Screening techniques, such as frequent hand screening, are often times utilized to eliminate blanks or doubles, and to ensure uniform size. For example, tolerance for seed coating compositions described herein can be +/−1/64 inch (0.4 mm), which is the US seed trade standard for sizing, established long before coatings were introduced. For example, coated lettuce seed is sown most frequently with a belt planter through an 8/64 inch (3.2 mm) diameter round holes in the belt. This hole size requires that the lettuce seeds coated with the composition according to the present invention can be sized over a 7.5/64 inch (3.0 mm) screen and through an 8.5/64 inch (3.4 mm) screen.

In one embodiment of the present invention, the seed may be contacted with the composition by using an "in situ coating" process, notably by implanting in a hole or a furrow in the soil a seed of a plant, and then applying the composition according to the present invention to surround or partially surround, or to be adjacent to the seed, so that the seed come into contact with the composition. According to the invention, the hole may notably be a hole, a cavity or a hollowed area. The seed may be one that has not be treated by any agent, or a seed that has been treated with an agrochemical (such as fungicide and insecticide) and that has not been treated with the composition of the present invention. Preferably, the composition is deposited on the carrier to provide a granule or a micro granule before being applied. The granule or the micro granule containing the composition may be prepared by using the methods described above.

Soil

In still another embodiment, the composition according to the present invention is administered to a soil in which a plant is cultivated. Then the seeds of the plant can be applied to the soil so that the seeds will come into contact with the composition. Notably, the composition in liquid form, such as in the form of aqueous solution/dispersion, or the composition in solid form, such as in powder or granule, may be used.

In one embodiment of the present invention, the guar is used in an amount ranging from 1 to 10 ml or g/kg of seed.

The invention also concerns the use of an agrochemical composition as disclosed above for treating a plant.

The above description of the method of the invention also applies to the use according to the invention.

Kit for Treating a Plant

The present invention also concerns a kit for treating a plant, said kit comprising a first composition comprising particles of at least one silicate selected from the group consisting of tourmalines, and a second composition comprising at least one guar.

In a preferred embodiment, the first composition further comprises at least a fungicide as described above.

In one embodiment, the method for treating a plant is using the above kit to coat the seeds. In this embodiment, the first composition above mentioned is first applied onto the seeds in the form of a liquid composition, and then the composition comprising at least one guar is applied onto the seed in the form of a liquid or solid composition.

The examples of implementation of the invention below are given purely by way of illustration and shall not be interpreted at limiting the scope thereof.

Experimental Part

Objective

The present work aimed at evaluating the effects of applying a mineral based formulation and/or a biobased polymers as seed coating treatment or as a foliar spray treatment in the culture of soy, with and without hydric stress.

Materials and Methods

General Characterization of the Area of Study

The experiments were done in the city of Botucatu, Sao Paulo state in Brazil, wherein the predominant climate in the place is the temperate (mesothermic) with rains in the summer and drought in the winter (Cwa—Köeppen), with average annual temperature of 20.5° C. and annual pluviometric precipitation of 1.533 mm.

Tests were done in green house with the following characteristics: 30 m of length, 7 m of width and 3 m height, covered with polyethylene film of low density and closed in the laterals with shading in 75% of the total area.

Materials

The minerals in the below described experiments is a powder of Tourmaline with D90=6 μm (referenced as G2 g below).

The following compounds have been used to prepare the samples:

Lamegal HS/B=Sodium polycarboxylate in aqueous solution Mw=2000 g/mol—from Lamberti Geropon T 36=Sodium polycarboxylate in aqueous solution—from Solvay Proxel GXL=an aqueous solution of 1,2-benzisothiazolin-3-one—from Lonza Rhodopol 23=xantan gum 2% in aqueous solution—from Solvay The biobased polymers in the below described experiments are:

Guar 1: a guar hydroxypropyltrimonium chloride having an average molecular weight between 5,000 and 25,000 Daltons, a DS of 0.1 to 0.2, and a MS between 0.2 and 1.0, available from Solvay (provided as a solution 20 to 40% in water)

Guar 2: a guar hydroxypropyltrimonium chloride having an average molecular weight of about 1,500,000 g/mol, a cationic degree of substitution of about 0.1 and a hydroxyalkyl molar substitution of about 0.5, available from Solvay (provided as a powder)

Preparation of the Mineral Formulation

In the case of the mineral, we have prepared a formulation (suspensions of minerals) for further use in seed coating and foliar spray, using the following protocol: Lamegal HS/B was added in water and mixed until homogeneous solution. Then, the mineral (G2 g) was added and mixed until homogeneous dispersion. Finally, a 2% aqueous solution of Rhodopol 23 was added and mixed until homogeneous formula. The mechanical agitator used was a IKA RW20 model with naval propeller stirrer.

Formulation G2 g—60% Active

| Component | Amount (% wt) |
| --- | --- |
| G2g Tourmaline D90 = 6 microns | 60.00 |
| Lamegal HS/B | 0.05 |
| Geropon T36 | 0.65 |
| Proxel GXL (antifungal) | 0.50 |
| Rhodopol 23 | 6.50 |
| Demineralized water | 32.30 |

Methods: Antioxidant Enzyme Activity and Total Protein

The leaves were collected at 30 days after planting for the analyses of total proteins and at 10 days after planting for the analyses of catalase, being collected 4 leaves of each treatment, which were selected and standardized with the limbo totally expanded. These leaves were put in plastic bags that were covered by aluminum foil and immediately frozen in liquid nitrogen to stop any ongoing reaction. After, bags were stored in an ultra freezer at −80° C.

The activity of the catalase (CAT, EC 1.11.1.6 (CAT=catalase and EC=Enzyme Commission number: each enzyme has a different number, and this one is the reference for catalase)) was measured based on the methodology proposed by KAR and MISHRA in KAR, M.; MISHRA, D. Catalase, Peroxidase, and Polyphenoloxidase Activities during Rice Leaf Senescence. Plant Physiology, v. 57, p. 315-319, 1976 (Kar & Mishra, 1976), with some minor changes as described below.

Extractor solution: 17.41 g of K2HPO4 (dibasic) is added in 1000 ml of distilled water (solution A), while 6.8 g of KH2PO4 (monobasic) is added in 500 ml of distilled water (solution B). Both solutions are homogenized, separately. Then, the monobasic solution is added into the dibasic solution until reaching pH 7.8 in order to prepare the solution C. After, 0.372 g of ethylenediaminetetraacetic acid (EDTA), 0.462 g of DL-dithiothreitol (DTT) and 0.300 g of polyvinylpolypyrrolidone (PVPP) are added in 1000 ml of solution C.

Determination solution: 17.41 g of K2HPO4 (dibasic) is added in 1000 ml of distilled water (solution A), while 6.8 g of KH2PO4 (monobasic) is added in 500 ml of distilled water (solution B). Both solutions are homogenized, separately. Then, the monobasic solution is added into the dibasic solution until reaching pH 7.5 in order to prepare the determination solution.

Enzymatic extract: It was used 0.1 g of frozen fresh leaves, which were grinded in liquid nitrogen. Then, it was added 3 mL of a solution called extractor solution. Sample is homogenized and centrifuged at 10000×g (the gravitational force in Earth) for 25 minutes at 4° C. The supernatant obtained from this process is called enzymatic extract.

Catalase activity determination: In a quartz cuvette it was added 1950 μL of determination solution, 150 μL of extraction solution, 750 μL of H2O2 (50 mM) and 150 μL of enzymatic extraction. In parallel, a blank was prepared by combining 1950 μL of determination solution, 300 μL of extraction solution and 750 μL of H2O2 (50 mM). The absorbance at 240 nm was measured in a spectrophotometer NI-2000 U V Vis, from Novainstruments, at 0 and at 80 seconds, aiming at verifying the absorbance decrease (when the absorbance of the sample reaches the same absorbance as the blank), which happened at 80 seconds in the present assay. The unit of catalase activity used was the amount of enzyme which breaks down 1 μmol of H2O2/min under the assay conditions described, and it was calculated as follows:

Catalase activity (μmol of H2O2 min-1 mg-1 of protein)=[(absorbance at 0 seconds−absorbance at 80 seconds)×A×B]/(C×D×E×F)

Where:
A=cuvette path length (in cm)
B=volume of enzymatic extraction (in μL)
C=weight of frozen fresh leaves (in mg)
D=volume of solution after centrifugation (in μL)
E=final time considered for absorbance reading (in minutes)
F=molar coefficient of $H_2O_2$ at 240 nm (39.4 μM-1 cm-1)

Total protein determination: The quantification of total proteins in the extract was determined according to the methodology proposed by Bradford (1976): ANALYTICAL BIOCHEMISTRY 72, 248-254 (1976) "A Rapid and Sensitive Method for the Quantitation of Microgram Quantities of Protein Utilizing the Principle of Protein-Dye Binding" by MARION M. BRADFORD. The reaction system was composed by 100 μL of enzymatic extract and 5000 μL of Bradford reactant. The reaction was conducted at 31° C. for 15 minutes and the absorbance at 595 nm was measured in a spectrophotometer NI-2000 U V Vis, from Novainstruments, at 80 seconds. Casein solution was utilized to make the standard curve.

Seed Coating

Treatments

The above prepared formulation and the biobased polymers were applied on seeds according to Table 1 below.

The seed was coated using a NoroGard R300 Laboratory Seed Coating, and a commercial seed treatment recipe (2 ml of Standak Top (insecticide from BASF)+2 ml Derosal Plus (fungicide from Bayer) per kg of seed). On top of the commercial recipe, the formulations below were added according to the following steps:

For Guar 1, a single composition comprising the above commercial insecticide and fungicide formulations, the suspension of G2 g and Guar 1 is prepared by mixing them all together and then is used for application onto the seeds in a liquid form (ml/kg).

For Guar 2, a first composition comprising the commercial insecticide and fungicide formulations and the G2 g suspension is prepared and applied onto the seeds in a liquid form, and a second composition made of Guar 2 in a solid form (powder) is applied on the seeds previously treated by the first composition (in g/kg).

Each treatment by each formulation as shown in Table 1 has been replicated 6 times. Each replicate was composed of 1 planter, with 5 plants.

TABLE 1

Treatments performed on seeds.

| Treatment | Mineral used | Dose of formulation |
|---|---|---|
| 1(blank) | None | — |
| 2 | G2g | 4 ml/kg seed |
| 3 | Guar 1 | 4 ml/kg seed |
| 4 | Guar 2 | 4 g/kg seed |
| 5 | G2g + Guar 1 | 2 + 2 ml/kg seed |
| 6 | G2g + Guar 2 | 2 ml + 2 g/kg seed |

Two different conditions have been tested: without hydric stress (Experiment 1) and with hydric stress (Experiment 2).

Planters of 35 liters were used, with 44.5 cm height and 36.6 cm of diameter, with sandy soil. No additional fertilizer nor nutrients were added in the soil. The collected soil was collected from the soil layer classified as distroferric red latosol.

The seeds that have been coated with the above described formulations (except for the blank which has been coated only with the commercial insecticide and fungicide formulations) were added in the planters in 5 furrows containing 3 seeds each, and after 10 days the thinning was performed, leaving only 1 plant per furrow.

For Experiment 2, the hydric stress was created by watering the plants every 2 days and measured by using a Piché Evaporimeter, and the hydric stress caused corresponded to 50% of evapotranspiration. For Experiment 1, plants were watered every day.

Results

Total Protein—Experiment 1—No Hydric Stress

Table 2 shows the increase of total protein for samples collected 30 days after planting.

TABLE 2

Increase (%) of total protein in soy plants compared to blank. No hydric stress.

|  | % increase of total protein @ 30 days after planting |
|---|---|
| T1 - Blank | 0 |
| T2 - G2g (4 mL) | 9.4 |

TABLE 2-continued

Increase (%) of total protein in soy plants compared to blank. No hydric stress.

|  | % increase of total protein @ 30 days after planting |
|---|---|
| T3 - Guar 1 (4 mL) | 9.3 |
| T4 - Guar 2 (4 g) | 36.4 |
| T5 - G2g + Guar 1 (1:1) (2 mL + 2 mL) | 51.4 |
| T6 - G2g + Guar 2 (1:1) (2 mL + 2 g) | 59.4 |

The treatments 5 and 6 according to the invention, showed the highest value of total protein, which means that the mixture of G2 g+Guar 1 or G2 g+Guar 2 is more effective than any of them alone.

Antioxidant Enzyme Activity—Experiment 1—No Hydric Stress

Table 3 shows the increase of activity of antioxidant enzyme catalase for samples collected 10 days after planting.

TABLE 3

Increase (%) in activity of the antioxidant enzyme catalase in soy plants compared to blank. No hydric stress.

|  | % increase of activity of antioxidant enzyme catalase @ 10 days after planting |
|---|---|
| T1 - Blank | 0 |
| T2 - G2g (4 mL) | 97 |
| T3 - Guar 1 (4 mL) | −26 |
| T4 - Guar 2 (4 g) | −3 |
| T5 - G2g + Guar 1 (1:1) (2 mL + 2 mL) | 138 |
| T6 - G2g + Guar 2 (1:1) (2 mL + 2 g) | 639 |

The treatments 5 and 6 according to the invention showed the highest value of total protein, which means that the mixture of G2 g+Guar 1 or G2 g+Guar 2 is more effective than any of them alone.

Total Protein—Experiment 2—Under Hydric Stress

Table 4 shows the increase of total protein for samples collected 20 days after planting.

TABLE 4

Increase (%) of total protein in soy plants under hydric stress compared to blank.

|  | % increase of total protein @ 20 days after planting |
|---|---|
| T1 - Blank | 0 |
| T2 - G2g (4 mL) | 3.6 |
| T3 - Guar 1 (4 mL) | 0.7 |
| T4 - Guar 2 (4 g) | 1.4 |
| T5 - G2g + Guar 1 (1:1) (2 mL + 2 mL) | 9.7 |
| T6 - G2g + Guar 2 (1:1) (2 mL + 2 g) | 22.5 |

The treatments 5 and 6 according to the invention showed the highest value of total protein, which means that the mixture of G2 g+Guar 1 or G2 g+Guar 2 is more effective than any of them alone.

Antioxidant Enzyme Activity—Experiment 2—Under Hydric Stress

Table 5 shows the increase of activity of antioxidant enzyme catalase for samples collected 10 days after planting.

TABLE 5

Increase (%) in activity of the antioxidant enzyme catalase in soy plants under hydric stress compared to blank.

| | % increase of activity of antioxidant enzyme catalase @ 10 days after planting |
|---|---|
| T1 - Blank | 0 |
| T2 - G2g (4 mL) | 86.6 |
| T3 - Guar 1 (4 mL) | 57.8 |
| T4 - Guar 2 (4 g) | −46.3 |
| T5 - G2g + Guar 1 (1:1) (2 mL + 2 mL) | 92.2 |
| T6 - G2g + Guar 2 (1:1) (2 mL + 2 g) | 388.9 |

The treatments 5 and 6 according to the invention showed the highest value of total protein, which means that the mixture of G2 g+Guar 1 or G2 g+Guar 2 is more effective than any of them alone.

Foliar Application

Treatments

The above prepared formulation and the biobased polymers have been sprayed in the form of concentrated suspension of mineral(s), according to table 6 below.

Each treatment by each formulation as shown in table 6 has been replicated 6 times. Each replicate was composed of 1 planter, with 5 plants.

TABLE 6

Treatments performed on foliar application.

| Treatment | Mineral used | Dose of formulation l/ha |
|---|---|---|
| 1'(blank) | None | — |
| 2' | G2g | 1 |
| 3' | Guar 1 | 1 |
| 4' | G2g + Guar 1 (1:1) | 0.5 + 0.5 |

Normal watering conditions have been used for this test.

Planters of 35 liters were used, with 44.5 cm height and 36.6 cm of diameter, with sandy soil. No additional fertilizer nor nutrients were added in the soil. The collected soil was collected from the soil layer classified as distroferric red latosol.

The seeds were added in the planters in 5 furrows containing 3 seeds each, and after 10 days the thinning was performed, leaving only 1 plant per furrow.

The different treatments were applied when plants were in the growth stage $R^1$ (flowering). The application was done by using a manual cone nozzle spray with pressurized CO2, at 0.3 kgf/cm2.

Results

Total Protein

Table 7 shows the increase of total protein for samples collected 30 days after planting.

TABLE 7

Increase (%) of total protein in soy plants compared to blank. No hydric stress.

| | % increase of total protein @ 30 days after planting |
|---|---|
| T1' - Blank | 0 |
| T2' - G2g (1 L/ha) | 31.9 |
| T3' - Guar 1 (1 L/ha) | 48.4 |
| T4' - G2g + Guar 1 (1:1) (0.5 + 0.5 L/ha) | 62.3 |

The treatment 4' according to the invention showed the highest value of total protein, which means that the mixture of G2 g+Guar 1 is more effective than any of them alone.

Antioxidant Enzyme Activity

Table 8 shows the increase of activity of antioxidant enzyme catalase for samples collected 10 days after planting.

TABLE 8

Increase (%) in activity of the antioxidant enzyme catalase in soy plants compared to blank. No hydric stress.

| | % increase of activity of antioxidant enzyme catalase @ 10 days after planting |
|---|---|
| T1' - Blank | 0 |
| T2' - G2g (1 L/ha) | 252.2 |
| T3' - Guar 1 (1 L/ha) | 258.5 |
| T4' - G2g + Guar 1 (1:1) (0.5 + 0.5 L/ha) | 685.2 |

The treatment 4' according to the invention showed the highest value of total protein, which means that the mixture of G2 g+Guar 1 is more effective than any of them alone.

Example 2: Seed Coating Tests in the Field

The experiments described below were done in the city of Rolandia, Parana state in Brazil, wherein the predominant climate is temperate (mesothermic) with rains in the summer and drought in the winter (Cwa—Köeppen), with average annual temperature of 22° C. and annual pluviometric precipitation of 1.300 mm.

Tests were done in experimental areas with the following characteristics: 10 m of length, 4.5 m of width.

The above prepared compositions were applied on seeds of soy according to the treatment schemes detailed in Table 9 below.

TABLE 9 treatment schemes for seed coating

| Treatment | Composition | Dose of composition applied (per kg of seeds) |
|---|---|---|
| T1 (blank) | None | — |
| T2 (invention) | G2g + Guar 1 | 2.0 ml G2g + 2.0 ml Guar 1 |
| T3 (invention) | G2g + Guar 2 | 2.0 ml G2g + 2.0 g Guar 2 |
| T4 (comparative) | G2g + chitin | 2.0 ml G2g + 2.0 g chitin |

The seeds were coated using a NoroGard R300 Laboratory Seed Coating device. The compositions above were mixed in the above amounts with two commercial seed treatment products (2 ml of Standak 250 FS (fungicide commercialized by BASF)+2 ml Protreat (fungicide commercialized by Novozymes) per kg of seed) and the final mixture was applied onto the seeds.

Directly after coating (except for the blank where the seeds were not coated at all), the seeds were planted using a Planter PST 9 from Tatu Marchesan, using 45 cm of space between the lines.

The initial stand was determined 15 days after planting, while the final stand was measure 30 days after planting.

The results obtained are detailed in Table 10 below.

TABLE 10

Results of seed coating tests in the field

| Treatment | Average initial stand (plant/m) | Average final stand (plant/m) |
|---|---|---|
| T1 (blank) | 9.0 ± 0.2 | 8.4 ± 0.2 |
| T2 (invention) | 10.9 ± 0.2 | 10.6 ± 0.2 |
| T3 (invention) | 10.9 ± 0.2 | 10.5 ± 0.2 |
| T4 (comparative) | 9.9 ± 0.2 | 9.5 ± 0.2 |

The treatments 2 and 3 according to the invention showed the highest values of initial and final stand, which correspond to a higher number of plants per meter and, consequently, a higher yield.

The invention claimed is:

1. An agrochemical composition comprising:
   particles of at least one silicate selected from the group consisting of tourmalines, and
   at least one guar, wherein the at least one guar comprises a cationic guar.

2. The agrochemical composition according to claim 1, wherein size of the particles of silicate ranges from 0.1 to 30 μm.

3. The agrochemical composition according to claim 1, wherein the particles of at least one silicate represent from 2 to 78% by weight, with regard to the total weight of the composition.

4. The agrochemical composition according to claim 1, wherein said cationic guar has a cationic degree of substitution ranging from about 0.001 to about 3.

5. The agrochemical composition according to claim 1, wherein said cationic guar has an average molecular weight of about 2,000 to about 3,000,000 g/mol.

6. The agrochemical composition according to claim 1, wherein the cationic guar is selected from the group consisting of a chemically modified guar obtained from guar and a cationic etherifying agent, and wherein the cationic etherifying agent is a quaternary ammonium salt selected from the group consisting of: 3-chloro-2-hydroxypropyl trimethyl ammonium chloride, 2,3-epoxypropyl trimethyl ammonium chloride, diallyldimethyl ammonium chloride, and trimethylammoniumpropyl methacrylamide.

7. The agrochemical composition according to claim 1, wherein the cationic guar is selected from the group consisting of: cationic hydroxyethyl guar, cationic hydroxypropyl guar, cationic hydroxybutyl guar, cationic carboxymethyl guar, cationic carboxylpropyl guar, cationic carboxybutyl guar, carboxymethylhydroxypropyl guar, and guar hydroxypropyltrimonium chloride.

8. The agrochemical composition according to claim 1, wherein the guar has a degree of hydroxyalkylation comprised between 0.1 and 1.7.

9. The agrochemical composition according to claim 1, wherein said guar is guar gum having an average molecular weight of between 2,000 Daltons and 90,000 Daltons.

10. The agrochemical composition according to claim 1, wherein the weight ratio between the total amount of particles of silicate on one hand and the total amount of guar on the other hand range from 1:5 to 5:1.

11. The agrochemical composition according to claim 1, wherein the agrochemical composition is in liquid form.

12. The agrochemical composition of claim 1, further comprising one or more fungicide(s).

13. The agrochemical composition of claim 1, further comprising a carrier selected from water or water mixed with one or more organic fluid(s).

14. The agrochemical composition of claim 1, wherein the composition further comprises at least 20% by weight of water, relative to the total weight of the composition.

15. A process for the preparation of the agrochemical composition according to claim 1, wherein the at least one guar, and the particles of at least one silicate are mixed together.

16. A kit for treating a plant, said kit comprising a first composition comprising particles of at least one silicate selected from the group consisting of tourmalines, and a second composition comprising at least one guar comprising a cationic guar.

17. A method for treating a plant wherein a composition as defined in claim 1 is applied onto at least one part of said plant.

18. The method of claim 17, wherein the composition further contains at least one biocide selected from herbicides, insecticides and fungicides.

19. The method of claim 17, wherein the plant is selected from the group consisting of soy, cane, cotton, wheat, beans, and rice.

20. The method of claim 17, wherein the kit is applied directly onto the plant, or is diluted just before application with a liquid diluent comprising water or a mixture of water and organic solvent, or is mixed just before application with another agrochemical composition.

21. The method of claim 17, wherein the composition is applied onto the foliar system of the plant.

22. The method of claim 17, wherein said composition is applied onto seeds of the plant.

* * * * *